United States Patent [19]

Nishida et al.

[11] 4,369,722

[45] Jan. 25, 1983

[54] CONTROL SYSTEM FOR A PLURALITY OF EMBROIDERY SEWING MACHINES

[75] Inventors: Koji Nishida, Anjyo; Osamu Miyake, Toyota, both of Japan

[73] Assignee: Aisin Seiki Kabushiki Kaisha, Aichi, Japan

[21] Appl. No.: 231,089

[22] Filed: Feb. 3, 1981

[30] Foreign Application Priority Data

Feb. 8, 1980 [JP] Japan .............................. 55-15580[U]
Feb. 21, 1980 [JP] Japan .................................. 55-21213
Mar. 3, 1980 [JP] Japan .................................. 55-26438

[51] Int. Cl.$^3$ ......................... D05C 5/04; D05B 21/00
[52] U.S. Cl. ................................. 112/103; 112/121.12
[58] Field of Search .................... 112/102, 103, 121.12, 112/121.11, 78, 86

[56] References Cited

U.S. PATENT DOCUMENTS 4,152,994  5/1979  Sugiyama ....................... 112/121.12
4,280,420  7/1981  Nishida et al. ....................... 112/103

Primary Examiner—Peter P. Nerbun
Attorney, Agent, or Firm—Sughrue, Mion, Zinn, Macpeak & Seas

[57] ABSTRACT

A control system allows an automatic parallel operation of a plurality of embroidery sewing machines each in accordance with individual pattern sewing control data. The control system essentially comprises a group of random access semiconductor memories capable of storing a plurality of sets of pattern sewing control data, each of which permits a single pattern sewing to be completed, a plurality of branch electronic controllers each associated with a different one of the sewing machines, and a single main electronic controller for reading one or several blocks of pattern sewing control data from the semiconductor memory and supplying it to the branch controller. The branch controller feeds a request for data supply to the main controller in timed relationship with the operation of the sewing machine.

In response to such request, the main controller supplies the data by reading it from the semiconductor memory at an address which is determined by the pattern number of the particular sewing machine which is preset on an operating panel and an address count which is updated as the machine sewing operation proceeds. The main controller is formed by a microcomputer while the branch controller is formed by a microcomputer having a memory or an electronic read-write controlling circuit which includes a buffer memory.

11 Claims, 9 Drawing Figures

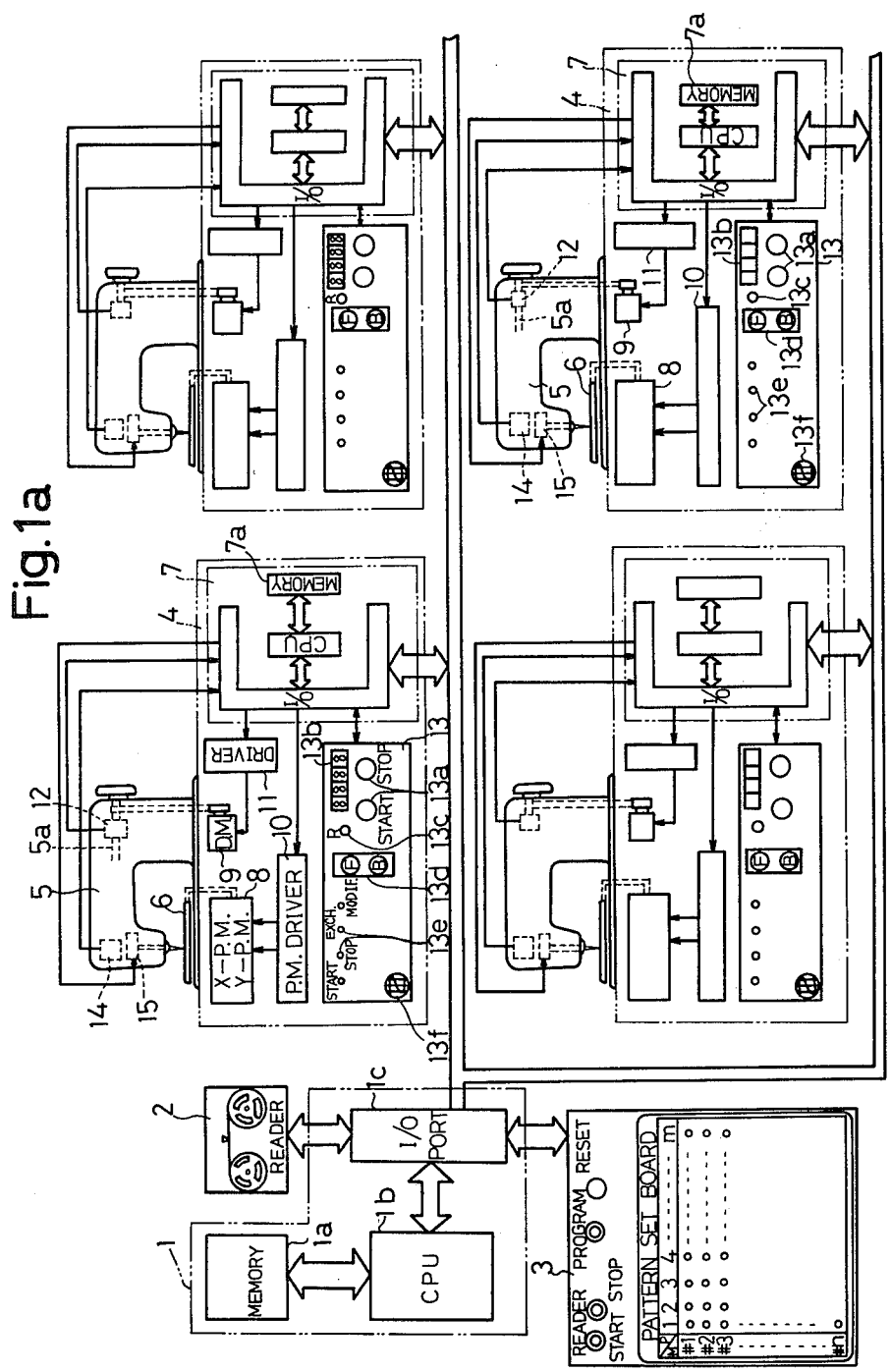

Master main routine

Master service routine

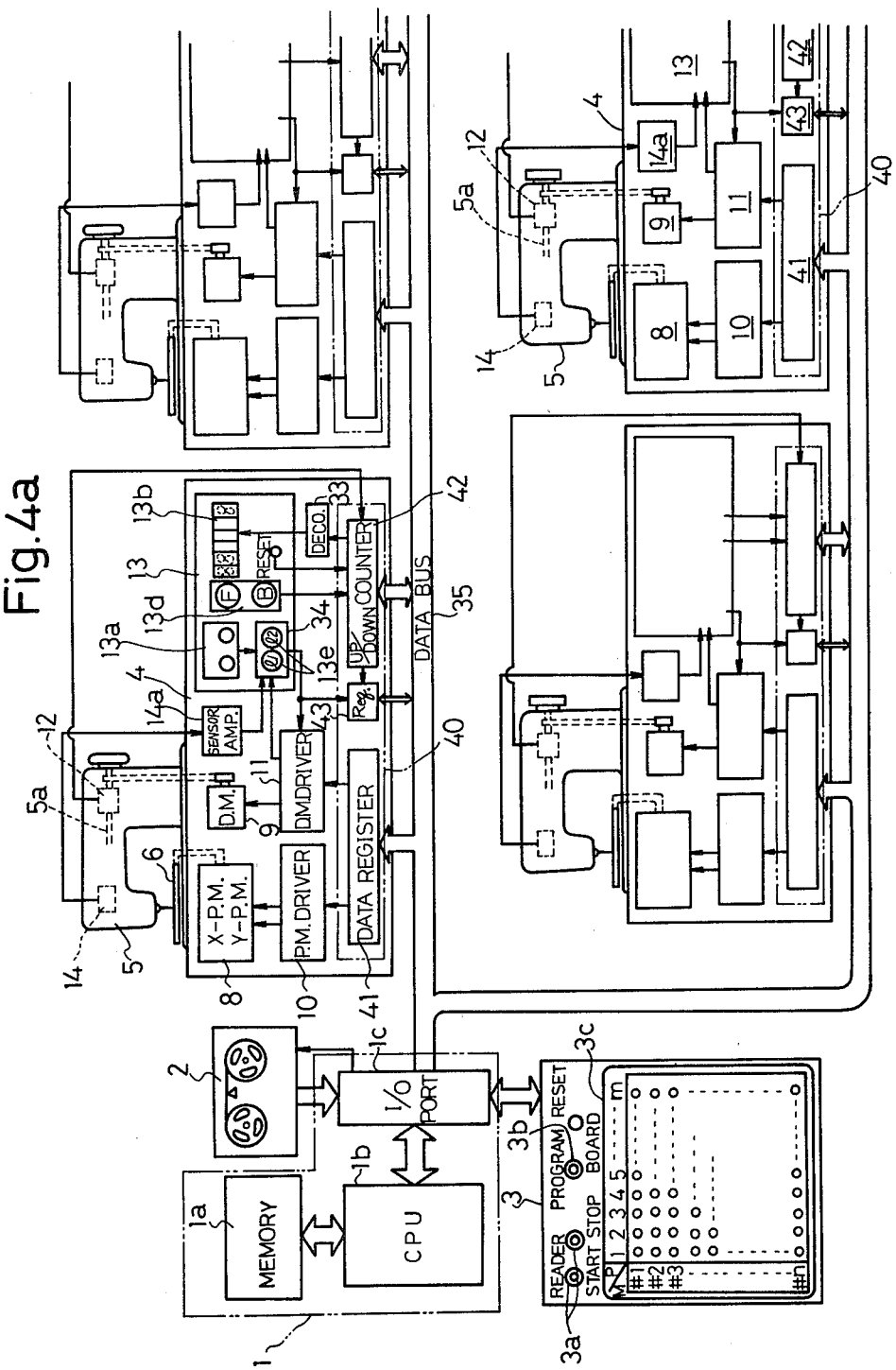

CONTROL SYSTEM FOR A PLURALITY OF EMBROIDERY SEWING MACHINES

BACKGROUND OF THE INVENTION

The invention relates to a control system for independently controlling a plurality of embroidery sewing machines in accordance with numerical data stored in a set of memories which control embroidery pattern sewing operations.

Recently, embroidery sewing machines are constructed as automated units. By way of example, U.S. patent application Ser. No. 139,040 filed Apr. 10, 1980 now Pat. No. 4,280,420, discloses an embroidery frame which is coupled to a pair of X- and Y-positioning mechanisms, to which embroidery sewing data is applied to drive the embroidery frame in the directions of X- and Y-axes in an automatic manner, thus providing an automatic embroidery sewing machine. To increase the efficiency of the embroidery sewing operation, a plurality of such and other automatic embroidery sewing machines having their embroidery frames automatically positioned are subject to a parallel operation. In such parallel operation, all of the machine heads are apparently integrally driven in a synchronized manner as are all of the embroidery frames provided on the individual machines. With a parallel operation of this type, in the event the operation of one of the machines must be interrupted as a result of a thread breakage or any other trouble, the operation of the entire system must be interrupted. In addition, at any one time, every machine head is capable of forming a same and common embroidery pattern. Upon completion of sewing a single pattern, the change of thread and embroidery frames must be simultaneously performed for all of the machine heads. Hence, if a single operator controls a plurality of automatic embroidery sewing machines, the manual intervention is concentrated at one time, which stands in the way to increasing the operational efficiency.

SUMMARY OF THE INVENTION

It is a first object of the invention to provide a control system for asynchronously controlling a parallel operation of a plurality of embroidery sewing machines having independent control mechanisms in accordance with embroidery sewing control data which is read out of a set of memories separately for each machine.

It is a second object of the invention to provide a control system for asynchronously controlling a parallel operation of a plurality of embroidery sewing machines in which a variety of pattern sewing data chosen for each machine is read out individually for the respective machines.

It is a third object of the invention to provide a control system of the type described which store a relatively large number of selectable sewing control data, with each sewing control data designated by a relatively small number of address bits.

The above and other objects of the invention are achieved in accordance with the invention by providing a set of random access memories, a main electronic controller for reading data out of the memories, and a plurality of branch electronic controllers corresponding to a plurality of embroidery sewing machines, each of which is provided with a pair of positioning mechanisms for driving an associated embroidery frame. Each of the branch controllers includes a buffer memory having a capacity of at least two data blocks, and a data processor for requesting the main controller to supply data, storing such data in the associated buffer memory and reading the data out of the buffer memory to supply it to the positioning mechanisms. The main controller also comprises a data processor which read data out of the memories and supply it to the branch controllers in response to a data request from the latter.

In a preferred embodiment of the invention, both the branch and the main controller are formed by LSI microcomputers. The branch controller feeds the address of desired data to the main controller, which reads the corresponding data out of one of the random access memories, specified by the particular address, and supplies it to the branch controller. Furthermore, the main controller controls the reading operation of a reader which reads data from a record medium such as card, tape or the like, and also controls the entry of the data read into a suitable random access memory.

BRIEF DESCRIPTION OF THE DRAWINGS

FIG. 1a is a block diagram of one preferred embodiment of the invention;

FIG. 1b is a more detailed block diagram illustrating a combination of a central processing unit and a memory, both shown in FIG. 1a;

FIGS. 2a and 2b are flowcharts showing the sequences of operation of the central processing unit shown in FIG. 1a;

FIGS. 3a, 3b, 3c are flowcharts illustrating the sequences of operation of the central processing unit of the microcomputer shown in FIG. 1a;

FIG. 4a is a block diagram of another embodiment of the invention;

FIG. 4b is a flowchart illustrating the sequence of operation of the central processing unit shown in FIG. 4a.

DESCRIPTION OF PREFERRED EMBODIMENTS

Figure 1B:
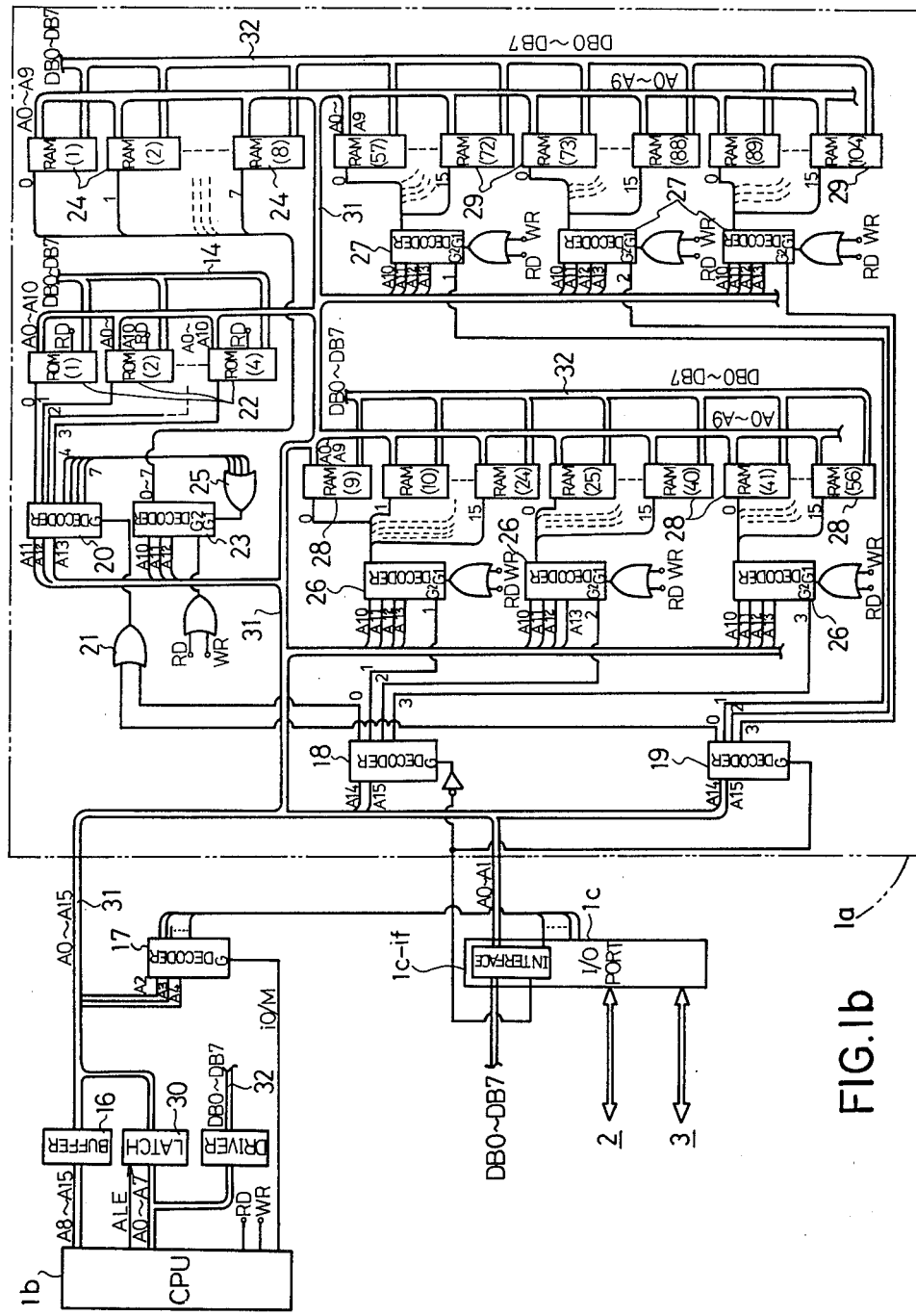
Figure 2A:
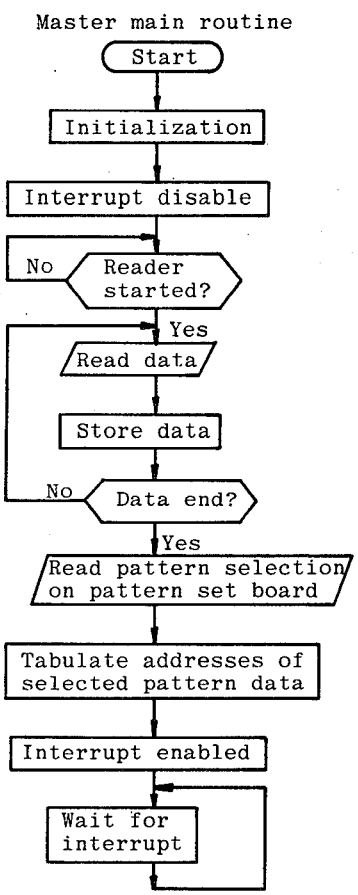
Figure 2B:
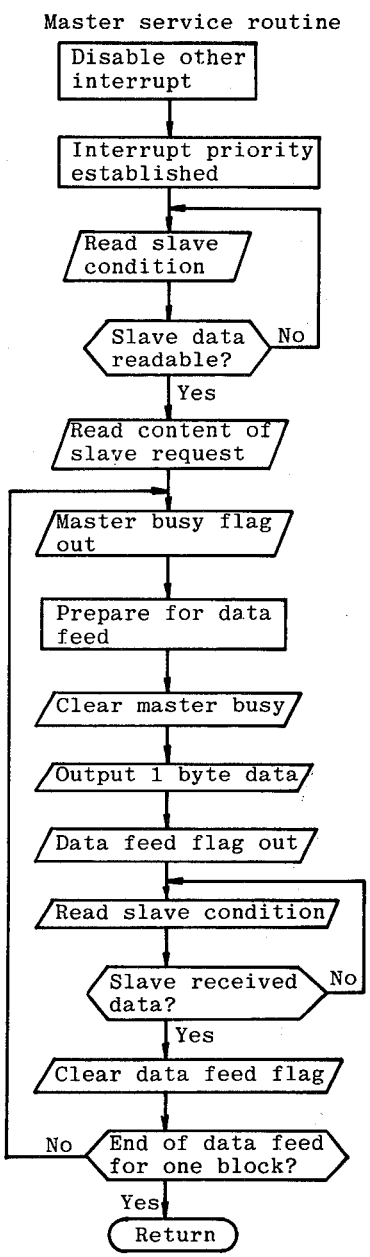

Referring to FIG. 1a which shows a first embodiment of the invention, there is shown a central control apparatus which supplies sewing control data to a plurality of embroidery sewing machines and comprising a main electronic controller 1, a magnetic tape reader 2 and a pattern set board 3. Those components of the main controller 1 which store and distribute requested groups of data from a great variety of numerical, pattern sewing control data are constructed by a so-called microcomputer which comprises a combination of various chips of large scale integrated circuits. The microcomputer 1 includes a random access memory 1a in which numerical, pattern sewing control data, hereafter referred to as pattern data, as read by the reader 2, is entered. An operator designates selected ones of the pattern data which is entered into the memory 1a, by means of the board 3, and assigns them to drive control units 4 of the individual machines.

Specifically, the microcomputer 1 stores a data processing program so that the leading address of each embroidery pattern can be recognized when entering the pattern data into the memory 1a. When a particular pattern is selected for each machine in terms of an index or number previously assigned to each embroidery pattern by utilizing the pattern set board 3, an address table indicating the leading address of a selected pattern data and its data content is formed and stored in a suitable register within the microcomputer. Subsequently, every time a data block is supplied, the address is advanced and is maintained while the data supply is interrupted in preparation to a next request for data supply.

It is one of the features of the invention that the entire data for a single embroidery pattern is divided into a plurality of data blocks, and that the data read-out from the memory 1a in response to a request of the pattern data from the drive control unit 4 takes place by continuously reading out several blocks or one block of data collectively for each request so as to be supplied to the respective drive control unit 4. In this manner, a number of sewing machines which may be as many as several tens of machines may be simultaneously and asynchronously operated without requiring that the operating speeds of the individual machines be limited to low values.

The pattern data for each embroidery pattern comprises numerical data presenting two coordinate components of a movement of an embroidery frame 6 for each stitch as the machine 5 is operated as well as control data representing a variety of information which appear in the course of proceeding from stitch to stitch, for example, a momentary stop, a thread change, a pause of needle bar, an end of pattern or the like. Thus, embroidery control data for each stitch and a variety of other data are joined together to define a set of pattern data which represents a single complete pattern. The drive control units 4, each of which corresponds to a different one of the sewing machines 5, are each provided with an individual branch electronic controller 7, a servo motor drive circuit 10 and a machine motor control circuit 11 which control a servo motor 8 and a machine motor 9, respectively, in accordance with control signals supplied from the branch controller. It is to be understood that each of the branch controllers is again formed by a microcomputer 7, which also produces a control signal to achieve a pause of the needle bar by controlling the engagement or disengagement of a clutch mechanism 15 contained in a needle bar drive system of the machine 5. However, the detail of such arrangement will not be described. Each sewing machine 5 includes an embroidery frame support and drive mechanism which transmits to the embroidery frame 6 a movement of X- and Y-axis component from servo motors 8. While not shown, the detail of a mechanism which causes a movement of the embroidery frame 6 in a plane under the control of such a pair of servo motors is disclosed in U.S. patent application Ser. No. 139,040. When an automatic control circuit of open loop type as shown is used, pulse motors are preferably used as the servo motors 8. If it is desired to use d.c. servo motors, a closed loop arrangement may be formed providing encoders associated with the servo motors and D/A converters between the motors and their associated drive circuit 10, thus achieving a similar function.

The machine motor 9 is independently provided for each sewing machine, but drives a main shaft 5a of the machine at substantially the same speed. A rotation signal emitter 12 is mounted on the main shaft 5 to provide a data output timing signal or a servo motor starting timing signal which is applied to the branch microcomputer 7. The branch microcomputer 7 is formed by a chip of microcomputer in the same manner as the main microcomputer 1. The branch microcomputer 7 is operative to start, stop or modify the operation of each sewing machine and is provided with a machine operating panel 13 including elements which display the condition of the sewing machine. The branch microcomputer 7 includes a memory 7a having a data capacity which is sufficient to store a plurality of data blocks. In response to a timing signal which is developed as the needle 5a of the machine moves upward through the embroidery frame 6, data for each stitch is read out from the memory 7a and fed to the servo motor drive circuit 10 and the machine motor drive circuit 11, thus controlling the drive imparted to the main shaft 5a of the machine and the movement of the embroidery frame 6.

Assuming that the memory 7a stores three blocks of data, for example, when the machine controlling data continues to be read therefrom to thereby leave only one block remaining in the memory, a data supplement request is fed to the main microcomputer 1 so that one block of succeeding data is fed to and stored in those spaces of the memory from which the data has previously been read out, as will be further described later. In this manner, by dividing the memory into three sections and supplementing one block of data for each cycle, it is assured that the data read-out takes place properly in both forward and reverse directions if a correction which is required by a trouble during the embroidery operation occurs across the boundary between adjacent blocks. By way of example, one data block may comprise 240 bytes corresponding to 80 steps so that the data capacity for the branch microcomputer 7 may be reduced to a relatively small value on the order of about $\frac{3}{4}$K. It is another feature of the invention that an interlock operation between the main and the plurality of branch microcomputers 1, 7 is achieved in a manner such that the succeeding data is supplemented from the main microcomputer 1 while one data block remains stored in each of the branch microcomputers and without substantially interrupting the control of an embroidery sewing control operation by the drive control unit 4.

Referring to FIG. 1b, there is shown a combination of the memory 1a and the central processing unit 1b in detail. In the present embodiment, the central processing unit 1b comprises what is commonly referred to as an 8-bit microcomputer. Such microcomputer includes 16 pins for the address lines. Since a number having 16 binary digits covers from 0 to 65,535, memory locations which can be addressed amounts to a maximum value of 65,536. Consequently, such memory capacity is referred to as 64K byte as is well known in the art. In other words, when a usual microcomputer arrangement is used, a number of memory locations which exceeds 64K bytes cannot be used on the board without utilizing some modification. In the present embodiment, of the address capability of the CPU having 64K capacity, a given number of addresses are assigned to a memory which is used to store program for the arithmetic operation of the microcomputer while the remaining addresses are used for a memory which stores the data. The addresses for memory locations which store the data are switched by the initial stage of an address decoder to permit a selective addressing of a plurality of sets of data storing memories. In this manner, a large quantity of control data can be stored, and the frequency of reading data into a numerically controlled apparatus which utilizes the microcomputer can be reduced while enabling an increased number of control modes.

Referring to FIG. 1b, the central processing unit (CPU) 1b includes 16 pins which are connected to address lines $A_0$–$A_7$ and $A_8$–$A_{15}$. As is well recognized, the address lines for the lowest eight digits, $A_0$–$A_7$ are shared by data lines. These address lines are combined into an address bus 31, which includes address $A_8$–$A_{15}$ corresponding to the most significant 8 bits which are supplied through a buffer 16 as well as address $A_0$–$A_7$ corresponding to the least significant eight bits which are fed under the control of a latch 30. The CPU 1b also outputs a memory write control signal WR, a memory read control signal RD and an input/output control signal iO/M. In response to the input/output control signal iO/M, a decoder 17 is operative to select a particular tip providing an input/output port address. In accordance with the combination of a suitable number of less significant digits $A_2$–$A_4$ from the address line 31, the decoder selects one of interfaces, 1c-if, from a plurality of input/output port chips contained in an I/O port 1C. An address within the selected chip is determined by the less significant address signal $A_0$–$A_1$. A memory selection signal is latched into the addressed input/output port from the data bus 32. In the embodiment shown, the selection of memories is one out of two, and hence the data which is latched is a single digit, either "0" or "1". The data output of the selected interface 1c-if is connected to an address decoder 18 associated with a first memory group, the chip selection of which is made by data "0", and to another address decoder 19 associated with a second memory group, the chip selection of which is made by data "1". It will be noted that the most significant digits $A_{14}$–$A_{15}$ are supplied to the address decoders 18, 19 from the address bus 13, whereby each decoder outputs a number "0" output for addresses less than 16K (16,384) corresponding to the fifteenth binary digit $A_{14}$, a number "1" output for addresses exceeding 16K, a number "2" output for addresses exceeding 32K and number "3" output for addresses exceeding 48K. The number "0" output of the both address decoders 18, 19 are connected to the inputs of OR element 21, the output of which is connected to chip select an address decoder 20 which is associated with a group of program memories. The address decoder 20 addresses four ROM memories 22 each having a 2K byte capacity. For addresses exceeding 8K, another address decoder 23 is chip selected, which is then effective to address a maximum of eight RAM memories 24 each having 1K byte capacity. In other words, the input of the address decoder 20 is connected to receive three digits from the address bus 31, beginning with the twelfth binary digits and including two more significant digits. 2K (2,048) corresponding to the lowest one of these digits, $A_{11}$, is treated as a unit and its first four outputs are connected with individual ROM memories 22. Addresses exceeding 8K are collectively fed through and OR element 25 to a first chip select terminal G1 of another address decoder 23 which is used to select a particular RAM. The decoder 23 has a second chip select terminal G2, to which the memory write control signal WR and the read control signal RD are applied through an OR element. Three digits are supplied from the address bus 13 to the decoder 23, beginning with the eleventh binary digit and including two more significant digits. Eight RAM memories 24 are connected to the individual one of eight outputs of the decoder 23, for addresses exceeding 8K, with each different one of the memories 24 being connected to one of the output terminals of the decoder on the basis of 1K (1,024) corresponding to the digit $A_{10}$. In this manner, these memories 24 can be sequentially addressed under the control of the memory write signal WR or read control signal RD.

Thus it will be seen that in the embodiment shown, the two address decoders 20, 23 are capable of addressing 16K bytes in total, independently from either memory group selecting decoder 18 or 19 is activated. These memories which are used to store 16K bytes which can thus be normally addressed are utilized to store programs which are required to operate the microcomputer system. Each ROM 22 is supplied with the least significant eleven digits from the address bus 13 in order to permit an addressing of respective 2K bytes. Similarly, each RAM 24 is supplied with the least significant ten digits to permit an addressing of respective 1K bytes. All of the ROMs 22 and RAMs 24 are connected to the 8-bit data bus 14. In addition, each ROM 22 is supplied with the read control signal RD.

From the foregoing description, it will be understood that a given number of addresses which is equal to 16K in the present embodiment as mentioned above (and which can be changed by a combination of decoders and their connections) of the maximum number of memory addresses of 64K which can be addressed by the 8-bit microcomputer is assigned for storing programs while remaining addresses are available to store the data. To iterate, by switching between the memory group selecting decoders 18, 19, the number of remaining available addresses is doubled. The both address decoders 18, 19 switch its output terminals on the basis of 16K as mentioned previously. For each of three outputs, all of which correspond to addresses exceeding the initial 16K, the respective output is connected to a second chip select terminal G2 of a first and a second bank of address decoders 26, 27. The both banks of decoders 26, 27 have their respective first chip select terminal G1 connected to receive the read control signal RD and the write control signal WR through individual OR elements. The purpose of these address decoders 26, 27 is to divide the address output from the number "1" to "3" output of the decoders 18, 19 into individual group of 1K addresses. At this end, each of the dividing decoders 26, 27 is supplied with four digits $A_{10}$–$A_{13}$, beginning with eleventh digit, from the address bus 31, and thus produce a sequential address on each of sixteen output lines which correspond to a group of 1K (1,024) addresses. A first group of RAM memories 28 which store the data are connected to individual outputs of each of the first bank of address decoders 26, and similarly a second group of RAM memories 29 are connected to the second bank of the address decoders 27. Each of these RAM memories 28, 29 has a capacity of 1K byte, and an address within the 1K capacity is determined by the least significant ten digits $A_0$–$A_9$ from the address bus 13. Obviously, each of these RAM memories is connected to an 8-bit data bus 32.

As a result of the described arrangement of the banks of address decoders, it will be seen that whenever a chip selection is made of the first selection address decoder 18, a total of 48 RAM memories 28, which represents the first data memory group, can be addressed while whenever a chip selection is made of the second selection address decoder 19, a total of 48 RAM memories 29, constituting the second data memory group, can be addressed. In this manner, in the present embodiment, a maximum of 96 1K byte RAM memories can be used to store the data. When a chip selection is made of either address decoder 18 or 19, if the address output therefrom reaches the maximum value of 16K, a chip selection is made of the address decoder 20 associated with the program memory group through the OR element 21, thus permitting an execution without interrupting the operation of the microcomputer system itself.

Referring back to FIG. 1a again, provided on the operating panel 13 of the sewing machine are start/stop buttons 13a for starting or stopppping an embroidery sewing operation, an indicator 13b for indicating an accumulated number of stitches or control steps as counted from the beginning of the pattern sewing operation, a reset button 13c associated with the indicator 13b, modifying buttons 13d, indicator lamps 13e for indicating the controlled condition, and an alarm buzzer 13f. It is to be noted that the term "control step" is used to designate the progress of data read-out from the memory 7a, and it does not always coincide with the accumulated number of stitches. More specifically, the pattern data may contain control data in the form of various information which may instruct a pause such as a thread change during a step, or instruct the embroidery frame 6 to move through several steps by causing a pause of only the needle bar as during a long traverse cloth feed. The indicator 13b may indicate either the number of control steps or accumulated stitches. The count indicated is decremented whenever the modifying button 13d is operated. To add, the branch microcomputer 7 is provided with a counter, not shown, which increments or decrements the address in response to a timing signal supplied by the rotation signal emitter 12 to enable a data read-out from the memory 7a and also enables the indicator 13b to indicate the count, thus allowing the progress of the embroidery sewing operation to be recognized. However, the indicator 13b may be omitted depending on the particular need. In the description to follow, it is assumed that data corresponding to one step includes one byte of control data representing the various information mentioned above as well as the end of pattern data, and one byte for each of numerical data representing the X- and Y-component. These three bytes are used to step the control sequence. The purpose of the modifying buttons 13d is to decrement the address of the memory locations in a stepwise manner in the event the thread is broken during the operation of the associated sewing machine 5 and the sewing operation has been proceeded without thread in place until the button is operated, thus allowing a movement of the embroidery frame 6 to a required location over an increased length of time. At this end, a pair of modifying buttons are provided to permit the address to be modified in both forward and reverse directions. However, when modifying the address in the reverse direction, the data which indicates the movement of the embroidery frame and which is read out in accordance with the modified address are inverted, for both X- and Y-axis components, before it is supplied to the servo motor drive circuit 10.

To recapitulate, the main microcomputer 1 operates to establish the supply, from among a number of pattern data, desired pattern data which are appropriate to the drive control units 4 of the respective sewing machines, and deliver three blocks initially and one block subsequently in response to each request of data supplied from the individual units. Each individual branch microcomputer 7 of the sewing machines 5 reads out a corresponding control step from the data received, in synchronized relationship with the rotation of the main shaft 5a in order to control the start/stop of the machine motor 9 and the movement of the embroidery frame 6, a display of the time whenever the thread is to be changed and other functions.

Referring to FIGS. 2a to 3c which illustrate flow charts, the sequence of the operation will be described by way of an example. Initially, referring to FIGS. 2a and 2b, the master operational sequence in the main microcomputer 1 includes a main routine which initially operates the data reader 2 to read a variety of pattern data, which are stored in the memory 1a. In the course of such operation, information indicative of the extent of the addresses associated with the respective patterns are suitably stored as a kind of data. Upon completion of the reading operation by the reader, the system enters the preparation to distribute desired pattern data to the plurality of branch microcomputers 7. It is assumed that the selection of embroidery patterns which are to be executed by the individual sewing machines 5 are established on the pattern set board 3a of the operating panel 3 of the main microcomputer. In accordance with such selection, addresses of those pattern data which have been selected in correspondence to the individual sewing machines are tabulated as a table in a memory of the microcomputer so as to be indexable. Specifically, each time a request for data supply from the respective sewing machines interrupts the main routine of the master sequence, the leading address of the data to be supplied is determined by the address table. The master sequence then waits for a request from the slave side or the branch microcomputers 7. In the event a request is already present, the master sequence responds thereto. If there are a plurality of requests from the slave side, the order in which such requests have been accepted are stored during the steps of initialization and interrupt disable of the main routine. A service to an interrupt having the highest priority is entered and followed by a service routine while disabling other interrupts. Subsequently, in the service routine, the content of the request from the slave side is initially read. The request from the slave side represents a number of blocks of pattern data. When the memories 7a on the slave side is divided into three sections each containing one block, the initial request will call for three blocks of data while a second and a subsequent request calls for one block of data. The master side supplies a necessary number of blocks of pattern data based on the address table, and returns to the main routine to wait for an interrupt upon completion of supplying the requested data. In this manner, the main microcomputer 1 successively responds to requests for data supply as the sewing operation of the individual sewing machines 5 proceeds during the operation of the overall control system.

Referring to FIG. 1b for a more detailed description of the control operation by the microcomputer 1, upon completion of the initialization, the I/O port of the input/output interface 1c-if which is previously chosen to select the address decoder, for example, port "0" is addressed and data "0" is latched therein from the address line 14. The data "0" makes a chip selection of the address decoder 18 which selectes the first memory group. Subsequently, the start of a reading operation on the board 3 is detected, and the data reader 2 is started to initiate a data reading operation in response thereto. The address decoder 18 supplies an address, through an initial one of the address decoders 26 in the first bank, to the initial one of the RAM memories 28 in the first group having addresses in the 17K or the RAM 9 shown, and continues to supply addresses until the prevailing address exceeds 64K before the termination of the data reading operation by the reader, whereupon it may decide to cause the content of the port "0" of the input/output interface 1c-if to be changed to "1" so as to make a chip selection of the address decoder 19 which selects the second memory group. Then, the data storing operation is continued by supplying addresses through the second bank of address decoders 27, beginning with an initial one of the RAM 29 in the second group, or the RAM 57 shown which has addresses in 81K. At this time, the address range from 65K to 80K is excluded and not used as addresses for the purpose of storing the data since they are shared with the first group which are used for the program RAM memories 22. Upon termination of the data reading operation, the data reader 2 is stopped.

During the data transfer to the individual sewing machines, in correspondence to setting of pattern numbers on the board 3, the individual microcomputers 7 are given the leading three blocks of pattern data of that number which has been preset on the board 3. For each machine number, the address of the last data supplied is incremented by one and the incremented address is entered into the data address table so that in response to each request for data supply from one of the microcomputers 7, the data address for the machine number associated with the requesting microcomputer 7 can be read from the data address table to permit the pattern data to be read from the memory 1a at such address so as to be supplied to the microcomputer 7. Thereupon, the data address in the table is incremented by 1. In the data reading operation, for addresses less than 64K, "0" is latched in the input/output port interface 1c-if to make a chip selection of the address decoder 18 to thereby enable a data read out from the first memory group while when the data address exceeds 64K, "1" is latched in the interface 1c-if to make a chip selection of the address decoder 19 to thereby enable a data read-out from the second memory group. It is to be noted that when switching from the first to the second memory group, an address which has just exceeded 64K immediately shifts into 81K range, since intervening 16K overlaps with the addresses in the program memories as mentioned previously. Consequently, if either address decoder 18 or 19 is selected, the ROM memories 22 and the RAM memories 24 which constitute the program memory group for storing the programs which are required to operate the microcomputer cannot be left out of service.

Figure 3A:
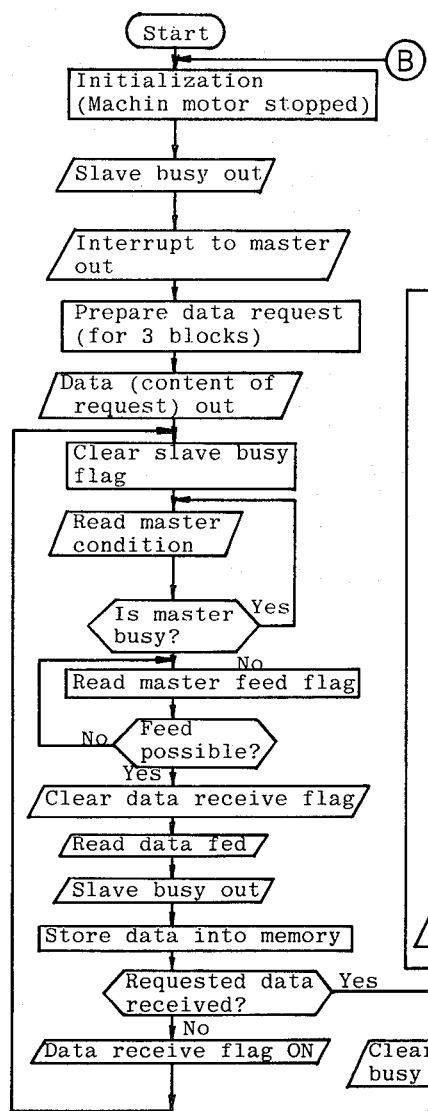
Figure 3C:
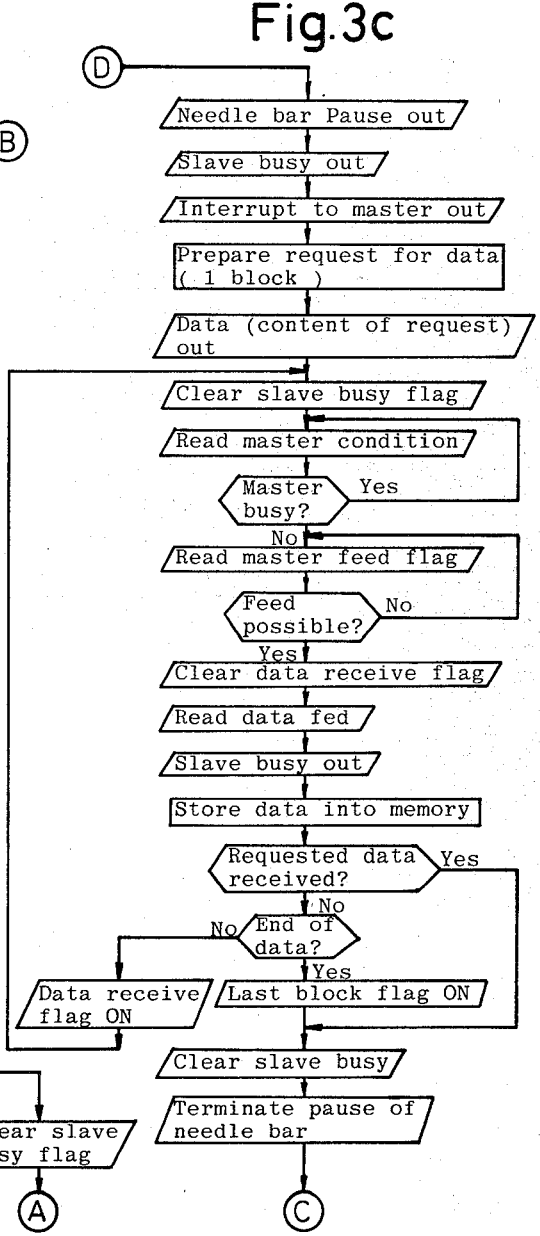
Figure 3B:
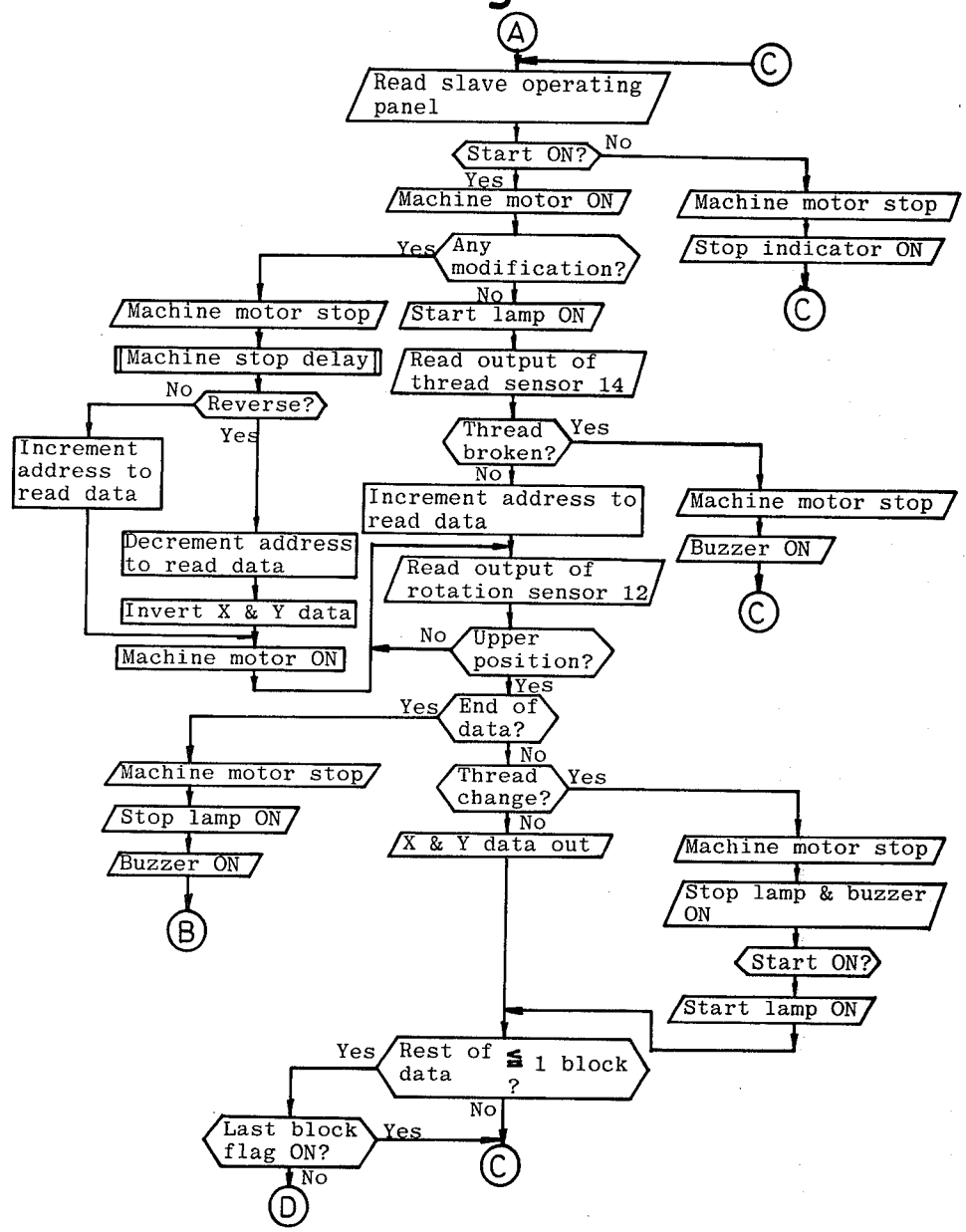

Referring now to FIGS. 3a, 3b and 3c to describe the control sequence of the branch microcomputers 4, it will be noted in the initial data receive routine shown in FIG. 3a that three blocks of pattern data are stored in the memories 7a of the slave side. During the execution of this routine, the interlock with the master service routine is achieved on a so-called shake-hand basis to perform a data transfer. During the initial data receive mode, no start is permitted until the three blocks of data have been received if the start button is operated on the slave operating panel or the operating panel 13 of the sewing machine. Upon completion of the initial data store, the sequence proceeds to the automatic embroidery sewing control shown in FIG. 3b. For this portion of the flow chart, various systems are known which performs an automatic operation by a sequence control in which control data stored in the memories of the microcomputer are read out in synchronized relationship with the operation of the sewing machine. By way of example, d.c. servo motors may be used as the servo motor 8 to provide a numerical control. Alternatively, during an increased traverse cloth feed, the movement of the needle bar may be temporarily held while allowing only the cloth feed to be continued for several steps. The individual functions and elements which are required in such numerical control of embroidery sewing machines and the requirement how many of such functional elements must be provided do not constitute part of the present invention, and hence such aspect is omitted from illustration.

Briefly describing the control function performed by this portion of the flow chart, initially it is detected that the start button 13a has been turned on on the operating panel 13 of the sewing machine. Then it is checked whether the modifying button 13d has been operated. When the modifying button is operated if the modification is in the reverse direction, one block of data is sequentially read from the memory at an address which precedes one by one, and data representing the X- and Y- axis component of the movement to be imparted to the embroidery frame is inverted. In the absence of any modification, the presence or absence of a detection signal from a thread breakage sensor 14 (see FIG. 1a) is checked. When such detection signal is absent, the sequence proceeds to the data read-out. The content of the data read out is determined in response to a timing signal from the rotation signal emitter 12, as indicated at block 16 (see FIG. 3b) of the flow chart. As mentioned previously, one block of data comprises three bytes, with the leading byte representing the control information. If the control information instructs a thread change or a pause of the needle bar during a long traverse stitch, such operation is executed. If it indicates numerical data for an ordinary embroidery stitch, the numerical data for controlling the servo motors associated with the X- and Y-axis components are supplied to the servo motor drive circuit 10, as indicated at block 17 in FIG. 3b, thus controlling the movement of the embroidery frame 6. Every time the data read-out and its processing for one step are terminated in this manner, it is determined whether the rest of data stored in the memory 7a is or is not one block. If the answer is in the affirmative, and if the remaining block of data does not contain information indicative of the end of pattern data, the master service routine is interrupted by a request for data supply, as shown in FIG. 3c.

In this data supplementing routine, it is necessary to consider the situation that interrupts from a plurality of slave machines are simultaneously present. Initially, a pause of the clutch mechanism 15 associated with the needle bar is caused, followed by a request for one block of supplemental data. The supplemental data is received in the same manner as the initial pattern data have been received. Since the second and the subsequent data supply feeds only one block, one block of data which has been used still remains within the memory 7a. Consequently, if the modification is required by some trouble to return the address, the address can be returned in the reverse direction without difficulty. During the data supplementing routine, if information indicative of the end of pattern data appears before the one block of data has not been received, a signal is stored in a suitable register as an index indicating that the data block contains the end of pattern data information. Subsequently, the system reinitiates the control of the embroidery sewing operation by terminating the pause of the motion of the needle bar in the same manner as it occurs at the completion of supplementing one block of data requested. The index that the end of pattern data information has been stored is used in a decision block 19 shown in FIG. 3b to determine whether the control sequence is to be directed to the repetition of the embroidery control routine rather than the data supplementing routine whenever the read-out from the memory 7a has been shifted to the last remaining block. In this manner, the individual slave machines execute the numerical control of the automatic sewing operation while receiving supplemental data from the master routine. When the end of pattern data is detected at a decision block 20 shown in FIG. 3b, a stop signal is supplied to the machine motor drive circuit 11, and signals are outputted which operate a stop display in the indicator lamp group 13c and the buzzer 13f.

To add, it should be understood that the data supplementing operation during the embroidery sewing operation takes place in a brief time interval which can be said substantially momentary and which is negligible to the period of the vertical oscillating motion of the needle of the machine 5. Accordingly, where the operating speed of the sewing machines is relatively low and/or a reduced number of sewing machines are operated simultaneously, the clutch mechanism 15 which drives the needle bar may be omitted.

FIG. 4a shows another embodiment of the invention where a branch controller 40 comprises a data register 41, an up-down counter 42 and a request register 43. The servo motor drive circuit 11 receives from the data register 41 an X- and Y-axis component data for each stitch of the associated sewing machine 5, and causes the servo motors 8 to rotate through given angles forwardly or reversely in accordance with the numerical data of the binary code supplied from the data register 41, thus causing a movement of the embroidery frame along the two axes. At the beginning of the set of data for each stitch which the data register 41 receives from the main electronic controller or microcomputer 1 during each revolution of the machine main shaft 5a, there is a control information for each step such as machine stop instruction which is produced at the time the thread is to be changed or at the end of pattern data, needle bar pause control signal which causes a temporary pause of the vertical oscillating motion of the needle while allowing the embroidery frame to move through a plurality of steps whenever a long cloth feed per stitch is involved. Data which is required for one revolution of the machine main shaft 5a is obtained by employing suitable means such as ternary counter to read out data from the memory 1a of the microcomputer 1, thus obtaining three bytes for each data request, the leading byte representing the control data and the remaining two bytes representing numerical data corresponding to the X- and Y-axis component of the movement of the embroidery frame. Means which control the pause of the needle bar is omitted from illustration in FIG. 4a. Only the machine motor drive circuit 11 is shown as an illustration of means which receive the control data. The drive circuit 11 controls the start and stop of the machine motor 9. For applying a motor start and stop signal to the drive circuit 11, a motor control latch 34 has its output connected to the drive circuit 11. The latch 34 stores the operation of the start/stop button 13a on the operating panel 13 of the individual sewing machines. It is to be noted that the latch 34 operates as a flipflop and is provided with an indicator lamp 13e which is located physically adjacent to the latch and which indicates the operating condition thereof. As inputs, the flipflop receives a signal representing a machine stop instruction which is supplied from the data register 41 and a stop signal which is produced by the detector circuit 14a whenever the thread breakage detector 14 of the sewing machine 5 has detected a breakage. Thus, the latch stops the machine motor 9 and indicates such condition when a thread breakage occurs in the sewing machine or when a stop instruction has been applied from the microcomputer 1 when the thread is to be changed or at the termination of sewing pattern. The output of the latch 34 is also connected to the request register 43, which also operates as a flipflop or gate. When set, it applies a request for data supply to the microcomputer. The data requested is identified by the address register 42 which comprises an up-down counter. As mentioned previously, the address register 42 accumulates its count, which represents an address where the data is to be read from the memory, by counting the number of revolutions of the main shaft 5a from the beginning of the sewing a particular pattern. It will be understood that this address comprises the leading address of the data program for a pattern selected which is preset in a suitable register or accumulator at the time the pattern set board 4 is preset within the microcomputer 1, plus the count contained in the address register 42. To provide means which read out three bytes of data per revolution of the main shaft 5a, the address register 42 may be constructed to count three times in succession in response to an output from the rotation sensor 12 which corresponds to one revolution. It is to be understood that the address register 42, which controls the address where the data is to be read out of the memory 1 as the main shaft 5a rotates, is not always active on the data bus 35, but that when the microcomputer 1 scans one of the request registers 43 which is set, that particular address register 42 of the drive control unit 4 of the sewing machine which has been selected by the scan operation is enabled to perform an addressing operation. The address register 42 is connected to maintain the request register 43 in its requesting condition each time it counts. The request register 43 is reset by a signal from the microcomputer 1 when the microcomputer 1 has finished to supply the data requested to the data register 41.

It is to be understood that the plurality of sewing machines 5 are each provided with one such drive control unit 4 including means which deliver to and receive from the microcomputer 1 a request for data supply, its address and data. Only one of these control units is selected for data access by the scan operation of the microcomputer 1. However, it is to be noted that while the data register 41, the request register 43 and the address register 42 are depicted within the associated drive control unit 4 of the respective sewing machines and separate from the microcomputer 1 for the convenience of illustration in FIG. 4a, the only intention is to emphasize that these elements form the essential part of the present invention and hence are associated with each of the sewing machines. Obviously, it will be practical to assemble these elements as part of the microcomputer 1 on its circuit board for implementation. The count in the address register 42 is fed through the decoder 33 to be numerically indicated on the step indicator 13b of the operating panel 13 of the associated sewing machine. As mentioned previously, the modifying button 13a is provided on the operating panel 13, and when it is operated, it is effective to increment or decrement the count in the address register 42 with a slow repeat period or with a suitable speed which is adequate to the modifying operation such as one step per operation, causing the location of the embroidery frame 6 to be shifted to that corresponding to a desired step in accordance with data supplied anew from the microcomputer 1 in response to the address modification and the request. However, as mentioned previously, the data supplied from the microcomputer 1 during the modification is inverted as far as numerical data is concerned before it is used in operation. However, the detail of such arrangement is omitted from illustration.

Figure 4B:
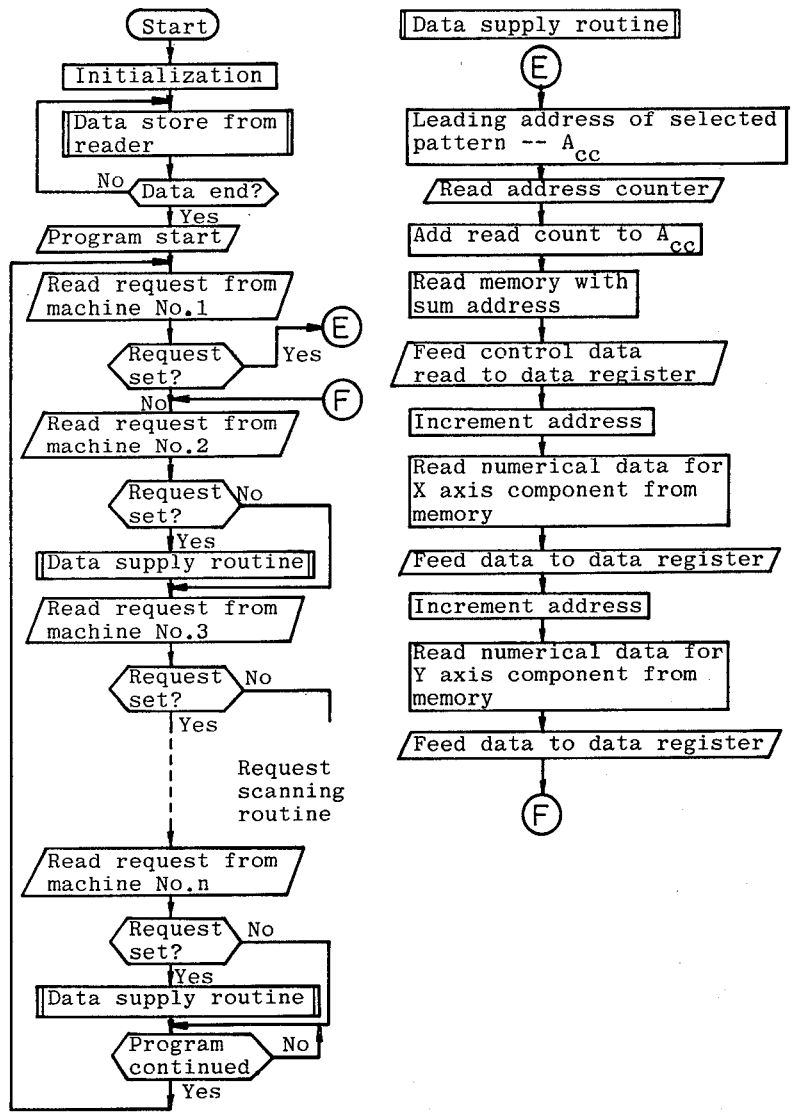

While a number of different manners of operation may be considered depending on the arrangement of detailed elements used in conjunction with the arrangement of the operating program of the microcomputer, the operation of this embodiment will now be described with reference to FIG. 4b. After the data is initially loaded in the memory 1a, the program switch 3b on the operating panel 3 of the microcomputer is started. In response thereto, a scanning is initiated in which the microcomputer 1 sequentially search for any data request from the plurality of drive control units 4 associated with the individual sewing machines. The scanning is started with the sewing machine No. 1, and when it finds a data request, it executes the data supply routine indicated on the righthand side of FIG. 4b. In the example shown, the data supply sequence begins with presetting in an accumulator on the pattern set board 3c the leading address of a particular pattern data within the memory 1a in which selected pattern data are stored, followed by reading the address register 42 of the requesting machine to add the value read to the content of the accumulator, with the sum being obtained as an address to read out data from the memory 1a and output it into the data register 41 of the requesting machine. Subsequently, the address in the accumulator is incremented twice, each time accompanying a read-out of numerical data, which is outputted to the same data register 41. Then the operation returns to one scanning routine.

It is to be noted that the above description is based on the assumption that data for one step of the operation of the sewing machine utilize three bytes as mentioned previously and that the program of the microcomputer is arranged to perform the supply of the three bytes in response to a single request. In this instance, on the part of the drive control unit 4, an arrangement may be made such that the address register 42 is initially incremented once for one revolution of the main shaft 5a and also operates to set the request register 43. It then outputs its count to the microcomputer 1 as an address whenever the request is read by the latter, followed by two incrementing operations. The request register 43 is reset when the microcomputer 1 has supplied three bytes of data to the data register 42. During the scanning of any request, those drive control units 4 are bypassed which have no request, as are those units which are quiescent because of a thread changing operation or the like. After the entire sewing machines have been scanned in this manner, the scanning is repeated until the program switch 3b is turned off, thus continuing to supply data to all of the operating sewing machines. It should be noted that the scanning operation occurs sufficiently rapidly as compared with the operating speed of the sewing machines 5 so that any delay caused in the data supply to a requesting unit because of the period with which the scanning is repeated presents no practical difficulty whatsoever. As a matter of practice, the number of sewing machines which are fed from a single microcomputer will be determined on the basis of the operating speed of the sewing machines and the period of the request scanning. As is conventional, the movement of the embroidery frame 6 for one stitch under the control of the servo motors 8, which are operated in accordance with the data supplied, occurs during the time when the needle of the sewing machines 5 has retracted above a cloth to be worked which is spanned across the frame 6. The operating speed as well as the number of the sewing machines 5 which can be controlled are also influenced by such factor.

As discussed above, in accordance with the invention, the main electronic controller 1 having a variety of automatic embroidery sewing control data stored therein supplies desired pattern data to each of the branch electronic controllers 7 or 40 contained in the drive control units associated with the plurality of sewing machines to permit an independent automatic embroidery sewing operation of each machine. Each of the branch controllers 7 or 40 is provided with the memory 7a or 41 to facilitate the achievement of a synchronization between the operation of the sewing machines and the read-out of the embroidery sewing data, as compared with an arrangement in which a set of memories such as 1a supply the same data for one stitch to the plurality of control units 4, respectively, simultaneously. As a result, a parallel simultaneous operation of an increased number of sewing machines can be achieved at a relatively high operating speed of the machines. Only one large capacity memory 1a is required on the part of the main controller 1 in order to store a variety of pattern data while relatively small capacity memory 7a or 41 may be provided in each of the branch controllers 7 or 40, thus affording an economical advantage. Since each sewing machine is capable of performing its own embroidery sewing operation independently from others, if a thread breakage occurs in a sewing machine or the operation of a sewing machine must be stopped to change the cloth or for repair purpose, the rest of sewing machines can continue to operate. Furthermore, a variety of worked products can be efficiently produced at one time.

What we claim is:

1. A control system for a plurality of embroidery sewing machines, comprising a plurality of branch electronic controllers each corresponding to one of the plurality of embroidery sewing machines, each of the branch controllers including buffer memory means, the branch controllers reading embroidery sewing control data from the buffer memory means and supplying it to an embroidery frame driver of the associated embroidery sewing machine, the branch controllers also presenting a request for embroidery sewing control data which is to be stored in the buffer memory means;

a random access memory capable of storing a plurality of sets of embroidery sewing control data;

and a main electronic controller responsive to a request for embroidery sewing control data from each of the branch controllers for reading a given number of blocks of embroidery sewing control data in a preselected set which is preselected to correspond to the requesting branch controller and supplying it to the requesting branch controller.

2. A control system according to claim 1 in which the branch controller includes an operating panel for selecting one of the sets of embroidery sewing control data stored in the memory, thereby imparting a code to the main controller which specifies a particular set of embroidery sewing control data which is assigned to the branch controller when the operating panel is connected to the main controller.

3. A control system according to claim 1, further including a reader for reading data from a record medium, the reader being adapted to be connected to the main controller, and wherein the memory comprises a read-write semiconductor memory, the operating panel including switch means which produce instructions to energize the reader and to cause the data read thereby to be stored in the memory, the main controller energizing the reader and causing the data read thereby to be written into the memory in accordance with instructions of the switch means.

4. A control system for a plurality of embroidery sewing machines each including a machine motor, a pair of servo motors which drive an embroidery frame and a motor driver, comprising
   a plurality of branch computers each including memory means for supplying an embroidery sewing control data to the motor driver in synchronized relationship with the operation of the sewing machine, the embroidery sewing control data including numerical data which represent a desired movement for the embroidery frame as well as other control data;
   a set of memories for storing a plurality of sets of embroidery sewing control data, each set enabling a control of a single embroidery sewing pattern to be completed;
   and a main computer for forming an address table in which the address of embroidery sewing control data which is to be supplied to each of the branch computers is stored, the main computer responding to a request from one of the branch computers to read embroidery sewing control data from one of the memories at the address specified by the address table and supplying such data to the branch computer while simultaneously updating the corresponding address in the address table, the main computer supplying a plurality of blocks of embroidery sewing control data in response to an initial request and supplying a block of embroidery sewing control data in response to a second and a subsequent request.

5. A control system according to claim 4, in which the main computer includes a group of memories having a maximum address which can be addressed by a central processing unit of the main computer, the memories being separated into program storing memories and data storing memories,
   further including a first memory group selecting address decoder including dividing address decoders which address a program memory which is used to store the operating programs of the microcomputer and a data storing memory which is formed by the remainder of the first memory group;
   a second address decoder including dividing address decoders for separately addressing those addresses which overlap the addresses of the program memory and another data storing memory which is separate from the first mentioned data storing memory and having addresses which exceeds the maximum address;
   OR means rendering those dividing address decoders active which are associated with the group of memories for storing programs in response to a selection output from either address decoder when the first and the second address decoder select the program memory;
   and decoder selecting data latch means for selecting either the first or the second address decoder in accordance with the data supplied in response to an input/output signal from the central processing unit.

6. A control system according to claim 4 in which the branch computer includes an operating panel which selects one of the sets of embroidery sewing control data stored in the memory, the operating panel being connected to the main computer to present a code thereto which specifies a set of embroidery sewing control data to be assigned to the branch computer.

7. A control system according to claim 4 further including a reader for reading data from a record medium, the reader being connected to the main computer, and wherein the memory comprises a read-write semiconductor memory, the operating board including switch means which produce instructions to energize the reader and to cause the data read thereby to be stored in the memory, the main computer energizing the reader and causing the data read thereby to be written into the memory in response to the instructions from the switch means.

8. A control system for a plurality of embroidery sewing machines each including a machine motor, a pair of servo motors which drive an embroidery frame and a motor driver, comprising
   a plurality of branch electronic controllers including a data register for receiving embroidery sewing control data which is to be supplied to the motor driver for each revolution of the main shaft of the embroidery sewing machine, a request register which presents a request for data supply for the next step after each revolution of the main shaft, and an address register for advancing the address at which the embroidery sewing control data is to be read out as the main shaft rotates;
   a group of memories for storing a plurality of sets of embroidery sewing control data, each of which enables the control of a single embroidery sewing pattern to be completed;
   and a main computer for scanning the request registers in a given order and responsive to any request for data supply from one of the request registers to read out data from one of the memories and supplying it to the data register of the requesting branch controller, the embroidery sewing control data being read from the memory at the address which is defined by the leading address of the set of embroidery sewing control data selected for the particular branch controller, added with a count in the address register of the branch controller.

9. A control system according to claim 8 in which the main computer includes a group of memories having a maximum address which can be addressed by a central processing unit of the main computer, the memories being separated into program storing memories and data storing memories,
   further including a first memory group selecting address decoder including dividing address decoders which address a program memory which is used to store the operating programs of the microcomputer and a data storing memory which is formed by the remainder of the first memory group;

a second address decoder including dividing address decoders for separately addressing those addresses which overlap the addresses of the program memory and another data storing memory which is separate from the first mentioned data storing memory and having addresses which exceeds the maximum address;

OR means rendering those dividing address decoders active which are associated with the group of memories for storing programs in response to a selection output from either address decoder when the first and the second address decoder select the program memory;

and decoder selecting data latch means for selecting either the first or the second address decoder in accordance with the data supplied in response to an input/output signal from the central processing unit.

10. A control system according to claim 8 in which the branch controller includes an operating panel which selects one of the sets of embroidery sewing control data stored in the group of memories, the operating panel being connected with the main computer to impart a code thereto which specifies a particular set of embroidery sewing control data which is assigned to the branch controller.

11. A control system according to claim 8, further including a reader for reading data from a record medium, the reader being adapted to be connected to the main computer, and wherein the memory comprises a read-write semiconductor memory; the operating panel including switch means which produce instructions to energize the reader and to cause the data read thereby to be stored in the memory, the main computer energizing the reader and causing the data read thereby to be written into the memory in accordance with instructions of the switch means.

* * * * *